US010208561B2

(12) United States Patent
De Stefano et al.

(10) Patent No.: US 10,208,561 B2
(45) Date of Patent: Feb. 19, 2019

(54) SMART FILTER CAKE FOR STRENGTHENING FORMATIONS

(71) Applicant: M-I L.L.C., Houston, TX (US)

(72) Inventors: Guido De Stefano, Houston, TX (US); James Friedheim, Spring, TX (US); Steven Young, Cypress, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/300,801

(22) PCT Filed: Mar. 30, 2015

(86) PCT No.: PCT/US2015/023254
§ 371 (c)(1),
(2) Date: Sep. 30, 2016

(87) PCT Pub. No.: WO2015/153407
PCT Pub. Date: Oct. 8, 2015

(65) Prior Publication Data
US 2017/0029688 A1    Feb. 2, 2017

Related U.S. Application Data

(60) Provisional application No. 61/972,871, filed on Mar. 31, 2014, provisional application No. 61/972,755, filed on Mar. 31, 2014, provisional application No. 61/972,805, filed on Mar. 31, 2014.

(51) Int. Cl.
| | | |
|---|---|---|
| *E21B 33/138* | (2006.01) | |
| *E21B 21/00* | (2006.01) | |
| *C09K 8/50* | (2006.01) | |
| *C09K 8/03* | (2006.01) | |
| *C09K 8/36* | (2006.01) | |
| *C09K 8/502* | (2006.01) | |
| *C09K 8/506* | (2006.01) | |
| *C09K 8/508* | (2006.01) | |
| *C09K 8/512* | (2006.01) | |
| *C09K 8/516* | (2006.01) | |
| *C09K 8/32* | (2006.01) | |
| *C09K 8/035* | (2006.01) | |

(52) U.S. Cl.
CPC ............ *E21B 33/138* (2013.01); *C09K 8/032* (2013.01); *C09K 8/035* (2013.01); *C09K 8/32* (2013.01); *C09K 8/36* (2013.01); *C09K 8/502* (2013.01); *C09K 8/506* (2013.01); *C09K 8/508* (2013.01); *C09K 8/512* (2013.01); *C09K 8/516* (2013.01); *E21B 21/003* (2013.01)

(58) Field of Classification Search
None
See application file for complete search history.

(56) References Cited

U.S. PATENT DOCUMENTS

| | | | | |
|---|---|---|---|---|
| 3,493,406 | A  * | 2/1970 | Fillet ....................... | C01B 33/32 |
| | | | | 106/287.1 |
| 4,732,213 | A  * | 3/1988 | Bennett .................... | C09K 8/50 |
| | | | | 166/275 |
| 4,799,549 | A  * | 1/1989 | Vinot ..................... | C09K 8/5045 |
| | | | | 106/803 |
| 4,891,072 | A  * | 1/1990 | Cooper ............... | C04B 40/0633 |
| | | | | 106/660 |
| 5,209,297 | A | 5/1993 | Ott | |
| 5,213,160 | A  * | 5/1993 | Nahm ................... | C04B 18/049 |
| | | | | 166/292 |
| 6,059,036 | A  * | 5/2000 | Chatterji ................. | C04B 28/26 |
| | | | | 106/605 |
| 6,312,741 | B1 | 11/2001 | Navarro | |
| 6,613,720 | B1 * | 9/2003 | Feraud ..................... | C09K 8/62 |
| | | | | 166/300 |
| 6,976,537 | B1 * | 12/2005 | Verret .................... | C09K 8/035 |
| | | | | 166/292 |
| 7,226,895 | B2 * | 6/2007 | Xiang .................... | C09K 8/145 |
| | | | | 166/244.1 |
| 7,740,068 | B2 * | 6/2010 | Ballard .................. | C09K 8/032 |
| | | | | 106/633 |
| 7,833,945 | B2 | 11/2010 | Harrower et al. | |
| 7,926,567 | B2 * | 4/2011 | Harris ................... | C01B 33/154 |
| | | | | 166/293 |
| 8,272,440 | B2 * | 9/2012 | Dalrymple ............. | C09K 8/512 |
| | | | | 166/292 |
| 8,383,558 | B2 | 2/2013 | Reddy et al. | |
| 8,455,404 | B2 | 6/2013 | Harrower et al. | |
| 8,474,532 | B2 * | 7/2013 | Ballard .................... | C09K 8/36 |
| | | | | 166/300 |
| 8,700,628 | B1 | 4/2014 | Korn et al. | |
| 9,701,887 | B2 * | 7/2017 | Burns .................... | C09K 8/5083 |
| 2005/0000734 | A1* | 1/2005 | Getzlaf ................. | C04B 12/005 |
| | | | | 175/73 |

(Continued)

OTHER PUBLICATIONS

International Search Report and Written Opinion regarding corresponding application No. PCT/US2015/023254; dated Jun. 23, 2015; 7 pages.

*Primary Examiner* — Anuradha Ahuja
(74) *Attorney, Agent, or Firm* — David J. Smith

(57) ABSTRACT

A method of sealing a formation that includes drilling a wellbore through the formation while pumping a non-aqueous based wellbore fluid comprising an encapsulated first component into the wellbore, the non-aqueous based wellbore fluid forming a filter cake on the walls of the wellbore; and adding a second component to the wellbore fluid when fluid losses are registered during drilling, whereby the first and second components react to form a chemical sealing layer in the filter cake is disclosed.

10 Claims, No Drawings

(56) References Cited

U.S. PATENT DOCUMENTS

| | | | |
|---|---|---|---|
| 2006/0079408 A1* | 4/2006 | Verret | C09K 8/035 |
| | | | 507/219 |
| 2006/0213662 A1* | 9/2006 | Creel | E21B 27/02 |
| | | | 166/286 |
| 2007/0089909 A1* | 4/2007 | Freeman | E21B 12/00 |
| | | | 175/57 |
| 2007/0244013 A1* | 10/2007 | Hoskins | C09K 8/035 |
| | | | 507/117 |
| 2008/0125334 A1* | 5/2008 | Burns | C09K 8/5083 |
| | | | 507/219 |
| 2008/0264637 A1* | 10/2008 | Burts | C04B 40/0666 |
| | | | 166/293 |
| 2009/0258798 A1 | 10/2009 | Munoz et al. | |
| 2010/0193244 A1* | 8/2010 | Hoskins | C09K 8/035 |
| | | | 175/5 |
| 2010/0243236 A1 | 9/2010 | Koons | |
| 2010/0258313 A1* | 10/2010 | Ballard | C09K 8/36 |
| | | | 166/300 |
| 2011/0056883 A1 | 3/2011 | Duncum et al. | |
| 2011/0214862 A1* | 9/2011 | Horton | C09K 8/03 |
| | | | 166/283 |
| 2012/0216990 A1 | 8/2012 | Quintero et al. | |
| 2013/0213838 A1 | 8/2013 | Keller et al. | |
| 2013/0233623 A1* | 9/2013 | Aston | C09K 8/16 |
| | | | 175/65 |
| 2014/0305646 A1 | 10/2014 | Chew et al. | |
| 2014/0352967 A1* | 12/2014 | Burns | C09K 8/5083 |
| | | | 166/305.1 |
| 2017/0015887 A1 | 1/2017 | De Stefano et al. | |
| 2017/0015890 A1 | 1/2017 | De Stefano et al. | |

\* cited by examiner

SMART FILTER CAKE FOR STRENGTHENING FORMATIONS

RELATED APPLICATION

This application is a National Stage application of International Application No. PCT/US2015/023254 filed Mar. 30, 2015, which claims priority to and the benefit of U.S. Provisional Patent Application having Ser. No. 61/972,871, filed 31 Mar. 2014; U.S. Provisional Patent Application having Ser. No. 61/972,755, filed 31 Mar. 2014; and U.S. Provisional Patent Application having Ser. No. 61/972,805, filed 31 Mar. 2014, which are all incorporated by reference in their entirety.

BACKGROUND

During the drilling or completion of an oil and gas well, the walls of oil and gas formations are often exposed to wellbore fluids which may damage producing formations. To prevent such damage, a wellbore often requires the deposit of a low-permeability filter cake on the walls of the wellbore to seal the permeable formation exposed by the drilling operation. The filter cake functions to limit drilling fluid losses from the wellbore as well as protect the formation from possible damage by the fluids filtering into the walls of the wellbore. Solids, such as particulate fines, suspended in the drilling fluid may also contribute to damaging hydrocarbon producing formations.

To protect formations from damaging fluids and solids, a filter cake may be formed and/or deposited on the surface of the subterranean formation. Filter cakes are typically formed when particles suspended in a wellbore fluid coat and plug the pores in the subterranean formation such that the filter cake prevents or reduces both the loss of fluids into the formation and the influx of fluids present in the formation. A number of ways of forming filter cakes are known in the art, including the use of bridging particles, cuttings created by the drilling process, polymeric additives, and precipitates.

SUMMARY

In one aspect, embodiments disclosed herein relate to a method of sealing a formation that includes drilling a wellbore through the formation while pumping a non-aqueous based wellbore fluid comprising an encapsulated first component into the wellbore, the non-aqueous based wellbore fluid forming a filter cake on the walls of the wellbore; and adding a second component to the wellbore fluid when fluid losses are registered during drilling, whereby the first and second components react to form a chemical sealing layer in the filter cake.

In another aspect, embodiments disclosed herein relate to a method of sealing a formation that includes drilling a wellbore through the formation while pumping a non-aqueous based wellbore fluid comprising an encapsulated first component and a second component into the wellbore, the non-aqueous based wellbore fluid forming a filter cake on the walls of the wellbore, whereby the first and second components react to form a chemical sealing layer in the filter cake.

In another aspect, embodiments disclosed herein relate to a composition that includes a non-aqueous fluid and an encapsulated component, wherein the component is selected from the group consisting of sodium silicate, potassium silicate, calcium chloride, strontium chloride, aluminum sulfate, an amine, an alcohol, an ester or amide, and combinations thereof.

Other aspects and advantages of the claimed subject matter will be apparent from the following description and the appended claims.

DETAILED DESCRIPTION

Generally, embodiments disclosed herein relate to methods for the formation of a filter cake in a wellbore. More specifically, embodiments disclosed herein utilize a non-aqueous based wellbore fluid and a multi-component system for the formation of a filter cake while drilling in a wellbore and selective reaction of the components upon the formation of the filter cake.

Embodiments of the present disclosure may be particularly suitable for drilling through depleted sandstone formations, as well as other depleted formation types. Depleted formations pose numerous technical challenges, including wellbore instability, severe lost circulation, etc., which generally make further development uneconomical. Uncontrollable drilling fluid losses frequently are unavoidable in the often large fracture characteristics of these formations. While conventional wellbore strengthening techniques often involve the use of particulates to create a hoop stress and thus increase the strength of the formation through formation of a stress cage, such techniques involve the formation of new fractures, which may be undesirable for a depleted formation. Thus, embodiments of the present disclosure seek to strengthen the formation through the formation of a chemical sealing layer at or in the filter cake. Embodiments may be distinguished from a conventional filter cake in that the chemical sealing layer provides greater strength and stability to the filter cake as compared to a filter cake formed from simple drilling fluid leak-off.

While a conventional filter cake may include polymeric and solid components therein to bridge pore throats and/or provide filtration reduction, the present embodiments are directed to a filter cake in which a chemical reaction, such as polymerization or crosslinking, occurs to change the chemical nature of the filter cake in situ. Further, in one or more embodiments, in situ refers to simultaneous with or following the formation of a filter cake. The chemical reaction of the fluid components may be selectively activated to prevent or at least reduce premature reaction within the drill string and also achieve reaction in the near-bit area, when desired. Thus, to achieve such selective activation, multiple components may be incorporated into the wellbore fluid(s). To avoid or reduce premature reaction, one of the components may be encapsulated or otherwise rendered chemically non-reactive. Upon activation and exposure to a second component, with which the first component is reactive, the two (or more) components may react and change the chemical nature of a filter cake and form a chemical sealing layer.

In one or more embodiments, a first component is included in a non-aqueous wellbore fluid and is encapsulated within a material composition that effectively limits the interaction of the first component with the other components of the non-aqueous based wellbore fluid. The encapsulated first component may be incorporated into the filter cake during the drilling process. While encapsulated, the first component remains dormant in the filter cake. However, as will be discussed in more detail below, the material composition making up the encapsulant may be engineered to release the first component within the filter cake upon a variety of external stimuli.

A second component may be utilized to react with an activated first component and affect the formation of a chemical sealing layer. In one or more embodiments, the second component may be an initial component of the wellbore fluid, while in another embodiment the second component may be added to the wellbore fluid when an operator deems it necessary to affect the formation of a chemical sealing layer in the currently drilled region of the formation. In other embodiments, the second component is provided as an initial component of the wellbore fluid, and may remain dormant in the fluid, and the first component may be added to the fluid when an operator deems it necessary to affect the formation of a chemical sealing layer in the currently drilled region of the formation.

For example, the addition of one of the components to the circulating wellbore fluid in an on-demand fashion may be beneficial if a fluid loss is registered via pressure change during drilling. Once the fluid loss is registered, the second component may be added and/or emulsified into the wellbore fluid and, once in combination with the first component already present in the filter cake, affect the formation of a chemical sealing layer on the filter cake in the problematic portion of the freshly cut formation.

In one or more embodiments, the first component is encapsulated within a material composition to form encapsulated particles. In one embodiment, the encapsulating composition may be thick and strong enough not to break/fragment by the shear forces or the pressure drop at the bit upon its injection from the drill string along with the wellbore fluid. However in other embodiments, depending on the composition of the selected encapsulant, the release of the first component may be based upon the shear forces generated at the bit. Such mechanisms may be used where the reaction between the first and second components is sufficiently delayed that the fluid is able to filter into the formation to form a filter cake before substantial levels of reaction have occurred.

The shear forces generated by the passage of the wellbore fluid through a restriction, e.g. a perforation or a drill bit may be sufficient to release the encapsulated first component. Without being bound by any theory, the inventors believe that the combination of shear and elongational flow experienced in these conditions may produce enough stress to break the encapsulant. Basically, the stress might first come from the turbulence experienced in the pumps of surface equipment and within the wellbore fluid itself; after that, the passage of the flow through a restriction creates first some sort of "Venturi effect" with an acceleration of the wellbore fluid which may have the effect of deforming the encapsulant and then at the outlet of the restriction another deformation of the encapsulant coming from the wellbore fluid deceleration. Velocity increases and decreases are of the order of 50 to 100 times variation. Strain rates experienced in restriction are from 1000 to one million reciprocal second, more specifically 10000 to 200000 reciprocal second. The inventors have noticed that even if the stress experienced during pumping and all along the transportation has an effect on the breakage of the encapsulant, the stress and/or velocity difference which is obtained due to the flow through a restriction may be of paramount importance. The stress is closely related to the pressure drop encompassed in each unit of the well treatment (pumps, pipes, drill-bit). A higher pressure drop corresponds to a higher stress applied. The highest stress is observed when the fluid passes through the nozzles in a drill bit or a port of the completion string downhole. By stress sufficient to break the encapsulant, it is to be under stood in the context of the present disclosure that said sufficient stress is produced by the passage through the nozzles of the drill bit or similar restriction to allow the first component to be released from the encapsulant. The pressure drop observed when passing through the nozzles is from about 150 to 5000 psi (10 to 345 bar), more specifically from 300 to 5000 psi (20 to 345 bar), most specifically from 300 to 1000 psi (20 to 69 bar). As shown earlier, the stress may sometimes also be referred to as a velocity difference.

In still other embodiments, the encapsulant may release the first component in response to an external stimulus or triggering event, which may include temperature, pH, enzymatic degradation, oxidants, solvents, or physical disruption, such as by grinding the encapsulant particles. It is also envisioned that encapsulants susceptible to triggered release may also be used in conjunction with passive diffusion encapsulants, and combined with any of the strategies disclosed above.

The encapsulation material may be a heat-activated material that remains intact prior to exposure to elevated temperatures, such as those present in a downhole environment, and upon heating, slowly melt and release the molecules or ions contained within. In some embodiments, the coating may melt at a temperature greater than 125° F. (52° C.). Examples of such materials are vegetable fat, gelatin, and vegetable gums, and hydrogenated vegetable oil. Other coatings may include materials selected from lipid materials such as, but not limited to, mono-, di-, and tri-glycerides, waxes, and organic and esters derived from animals, vegetables, minerals, and modifications. Examples include glyceryl triestearates such as soybean oil, cottonseed oil, canola oil, carnuba wax, beeswax, bran wax, tallow, and palm kernel oil. Heat-activated materials may also include those disclosed in U.S. Pat. No. 6,312,741, which is incorporated herein by reference in its entirety.

In a particular embodiment, the encapsulating material may include enteric polymers, which are defined for the purposes of the present disclosure, as polymers whose solubility characteristics are pH dependent. Here, this means that salt release is promoted by a change from conditions of a first predetermined pH value to a second predetermined pH condition.

Enteric polymers are commonly used in the pharmaceutical industry for the controlled release of drugs and other pharmaceutical agents over time. The use of enteric polymers allows for the controlled release of the monovalent or polyvalent salt under predetermined conditions of pH, or a combination of pH and temperature. For example, the Glascol family of polymers are acrylic based polymers (available form Ciba Specialty Chemicals) are considered suitable enteric polymers for the present disclosure because the solubility depends upon the pH of the solution. In an illustrative embodiment of the present disclosure, an enteric polymer may be selected as an encapsulating material that is substantially insoluble at pH values greater than about 7.5 and that is more soluble under conditions of decreasing pH.

Encapsulating materials may also include enzymatically degradable polymers and polysaccharides such as galactomannan gums, glucans, guars, derivatized guars, starch, derivatized starch, hydroxyethyl cellulose, carboxymethyl cellulose, xanthan, cellulose, and cellulose derivatives. Enzymatically degradable polymers may include glycosidic linkages that are susceptible to degradation by natural polymer degrading enzymes, which may be selected from, for example, carbohydrases, amylases, pullulanases, and cellulases. In other embodiments, the enzyme may be selected from endo-amylase, exo-amylase, isoamylase, glucosidase, amylo-glucosidase, malto-hydrolase, maltosidase, isomalto-hydrolase or malto-hexaosidase. One skilled in the art would appreciate that selection of an enzyme may depend on various factors such as the type of polymeric additive used in the wellbore fluid being degraded, the temperature of the wellbore, and the pH of wellbore fluid.

Additionally, the mean diameter of each encapsulated particle should be sufficiently large to assure that it may be effectively embedded into the filter cake. In one or more embodiments, the particles formed by encapsulating the first component have a mean diameter of about 20 to 30 micron. In one or more embodiments, the material composition of the encapsulant comprises at least one dissolvable material, which may be a material that slowly dissolves in the non-aqueous based drilling fluid. In one or more embodiments, the dissolvable material is a high temperature wax such as carnauba wax or a polyalkyleneglycol such as polyethylene glycol. Carnauba wax is one of the hardest waxes, possessing a high melting point (~170° F.) and is substantially insoluble in water and most other solvents. However under downhole conditions in the presence of a non-aqueous wellbore fluid, over time carnauba wax may dissolve in the non-aqueous based wellbore fluid and release the first component therein.

The first component may comprise an encapsulated fluid or solid. In one or more embodiments, the encapsulated first component may comprise silicates selected from one or more of sodium silicate, potassium silicate, lithium silicate, quaternary ammonium silicates, and the like either in solid or solution form. In order to create an effective chemical seal, when the first component comprises a silicate, the second component may comprise at least one alcohol, polyol, amine, polyamine or ester/amide designed to hydrolyze in the downhole conditions to produce an alcohol/amine. In more specific embodiments, the alcohol added or produced via hydrolysis may be at least one of a polyol containing 2 to 8 carbon atoms, including ethylene glycol, 1,2-propylene glycol, 1,3-propylene glycol, 1,4-butylene glycol, 1,5-pentanediol, 1,7-heptanediol, and the like. Other potential alcohols included are polyoxyalkylene glycols and water-soluble monoalkyl ethers of glycols and polyoxyalkylene glycols, polyoxyalkylene glycols such as polyoxyethylene glycols and polyoxypropylene glycols, monoalkyl ethers of glycols include monomethyl ether of ethylene glycol, monoethyl ether of ethylene glycol, monobutyl ether of ethylene glycol, mono-methyl ether of propyleneglycol, monobutyl ether of propylene glycol, monomethyl ether of diethylene glycol, mono-ethyl ether of diethylene glycol, monobutyl ether of diethylene glycol and the like.

Suitable hydroxyl-containing polymers also include saccharides such as xanthan gum, guar gum, carboxymethylated polysaccharides, hydroxypropyl polysaccharides, carboxymethyl, hydroxyproply polysaccharides, and similarly derivatized starches. Other examples include guar gum, cellulose, arabic gum, guar gum, locust bean gum, tara gum, cassia gum, agar, alginates, carrageenans, chitosan, scleroglucan, diutan, or modified starches such as n-octenyl succinated starch, porous starch, and hydroxypropyl- and/or carboxymethyl-derivatives of any of the above. Other suitable hydroxyl-containing polymers may be selected from synthetic polymers such as polyvinyl alcohol, partially hydrolyzed polyvinyl acetate, and copolymers containing vinyl alcohol or other monomers containing hydroxyl-substituted side chains. Further, suitable crosslinkable polymers may be branched or linear polyols with available hydroxy and/or amino groups.

Suitable amines may include small molecules and polymers capable of reacting with a silicate to form a LCM such as, for example: methylamine, ethylamine, propylamine, isopropylamine, butylamine, amylamine, hexylamine aniline, toluidine amine, xylidine amine, naphthylamine, benzylamine, di- and polyamines such as $C_6$-$C_{12}$ diamines, phenylenediamine, ethylenediamine, tetramethylenediamine, pentamethylenediamine, hex amethylene diamine, octamethylenediamine, decamethylenediamine, xylylenediamine, diphenylamine, piperazine and other compounds such as aminocaproic acid, polyamines, alkylene polyamines, vinyl amines, diethylenetriamine, triethylenetetramine, tetraethylenepentamine, and the like. Other possible components include species that contain heterogeneous functional groups such as aminoacetaldehyde diethyl acetal, aminoacetic acid, aminobenzoic acid, 2-amino-1-butanol, 2-aminoethanol, 1-amino-2-propanol, 0-aminophenol, p-aminophenol, 1-amine-2-propanol, 6-amino-2-picoline, 2-amino-4-nitrophenol, aminosuccinic acid (DL Aspartic acid), 2-aminopyridine, and mixtures thereof. In one or more embodiments, suitable amino-containing components may include polyetheramines such as the series of Jeffamines® available from Huntsman Corporation (Dayton, Tex.).

While not bound by a particular theory, it is believed that the combination of the silicate species and the alcohol or amine from the second component initiates a series of hydrolysis and condensation reactions that serve to generally increase the molecular weight of the silicate species and in some instances crosslink the silicate monomeric units. The increase in molecular weight and silicate bridging (crosslinking) of the silicate species serves to generate a viscous gel which may form a more robust chemical seal in the filter cake where the encapsulated particles were first embedded.

In other embodiments, first component silicates may also be reacted with second component multivalent cations (e.g., $Ca^{+2}$, $Mg^{+2}$, $Al^{+3}$, $Fe^{+3}$, etc.) to produce insoluble metal silicates or metal silicate gels. For example, upon addition of divalent calcium ions, a monovalent silicate may react with the calcium to form a hydrated calcium silicate. Multivalent cations may be derived from the corresponding salts such as bicarbonates, phosphates, polyphosphates, sulfates, etc. Such inorganic setting agents may be included in the external phase of the fluid (or in a second emulsion) so that, during emplacement of a fluid in a wellbore, the setting agent is kept separate from silicate internal phase to avoid premature crosslinking of the silicates and setting of the fluid.

In one or more other embodiments, when the first component is a sodium or potassium silicate, the second component may comprise an inorganic salt. More specifically, in one or more embodiments, the inorganic salt may be calcium chloride ($CaCl_2$), aluminum sulfate ($Al_2(SO_4)_3$), or strontium chloride ($SrCl_2$). When the second component is an inorganic salt, the reaction with the sodium or potassium silicate first component will result in precipitation of a calcium, aluminum, or strontium silicate, respectively, within the filter cake. The precipitate may create a more robust chemical seal in the filter cake where the encapsulated particles were first embedded.

Additionally, the water solubility of such silicates is due to the presence of alkali metal oxides ($M_2O$) which maintain the pH at a level where silica ($SiO_2$) can be dissolved. However, if the pH is neutralized or lowered, the solubility of the silica is reduced and it gels or polymerizes. Silicate gelation refers to the self-polymerization or condensation of soluble silicate structures to form a hydrous, amorphous gel structure of silicate, which rapidly occurs at a pH below 10.5. Thus, in one or more embodiments, pH may be used to control the deposition of silica within the filter cake. For example, a decrease in pH may be used to trigger the precipitation of a silica at the filter cake when a drop in fluid pressure is detected. In order to affect a pH change in some embodiments, a mineral acid such as HCl or formic acid may deployed downhole as the second component.

Other potential mechanisms for decreasing the pH of the surrounding fluid and precipitating a silica in the filter cake include injection of an ester that hydrolyzes to produce the corresponding carboxylic acid. Suitable esters may include formic or acetic acid ester of a $C_4$-$C_{30}$ alcohol, which may be mono- or polyhydric. Other esters that may find use in triggering gelation of the silicates of the present disclosure include those releasing $C_1$-$C_6$ carboxylic acids, including hydroxycarboxylic acids formed by the hydrolysis of lactones, such as δ-lactone and γ-lactone). In another embodiment, a hydrolyzable ester of $C_1$ to $C_6$ carboxylic acid and a $C_2$ to $C_{30}$ poly alcohol, including alkyl orthoesters, may be used.

It is also within the scope of the present disclosure to use any one of the aforementioned acids, inorganic salts, amines, alcohols, or esters/amides designed to hydrolyze under downhole conditions to produce alcohols/amines as the encapsulated first component or as an inactivated first component. That is, in one or more embodiments, the first component may be the ester or amide that hydrolyzes under downhole conditions to produce a reactive alcohol or amine. In these instances, the second component may comprise a sodium or potassium silicate fluid, which may be added and/or emulsified into the non-aqueous wellbore fluid either as part of the fluid initially or added when fluid loss is registered in an on-demand fashion. Further, when using a silicate fluid in an invert emulsion wellbore fluid, the silicates may optionally form a distinct internal phase from brines which may also be emulsified. In one or more other embodiments, as a preventative measure against fluid loss the first and second components may be directly combined together in the non-aqueous based wellbore fluid and used during the wellbore operation before a fluid loss event is registered.

The non-aqueous based wellbore fluids may include, for example, an oleaginous continuous phase, a non-oleaginous discontinuous phase, first and second components as indicated above, weighting agents, emulsifiers, viscosifiers, and/or other additives conventionally used in drilling fluids.

The oleaginous fluid may be a liquid and more specifically is a natural or synthetic oil and more specifically the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more specifically about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and specifically is an aqueous liquid. More specifically, the non-oleaginous liquid may be selected from the group including sea water, a brine containing organic and/or inorganic dissolved salts, liquids containing water-miscible organic compounds and combinations thereof. The amount of the non-oleaginous fluid is less than the theoretical limit needed for forming an invert emulsion. Thus, in one embodiment, the amount of non-oleaginous fluid is less than about 70% by volume, and more specifically from about 1% to about 70% by volume. In another embodiment, the non-oleaginous fluid is from about 5% to about 60% by volume of the invert emulsion fluid. The fluid phase may include either an aqueous fluid or an oleaginous fluid, or mixtures thereof.

Conventional methods can be used to prepare the drilling fluids disclosed herein, in a manner analogous to those normally used to prepare conventional oil-based drilling fluids. In one embodiment, a desired quantity of oleaginous fluid such as a base oil and a suitable amount of a surfactant are mixed together and the remaining components are added sequentially with continuous mixing. An invert emulsion may also be formed by vigorously agitating, mixing or shearing the oleaginous fluid and the non-oleaginous fluid.

Other additives that may be included in the wellbore fluids disclosed herein include for example, wetting agents, organophilic clays, viscosifiers, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Emulsifiers that may be used in the fluids disclosed herein include, for example, an alkoxylated ether acid. In embodiment of an alkoxylated ether acid is an alkoxylated fatty alcohol terminated with an carboxylic acid, represented by the following formula:

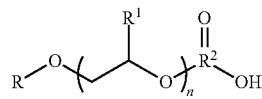

where R is $C_6$-$C_{24}$ or —C(O)$R^3$ (where $R^3$ is $C_{10}$-$C_{22}$), $R^1$ is H or $C_1$-$C_4$, $R^2$ is $C_1$-$C_5$ and n may range from 1 to 20. Such compound may be formed by the reaction of an alcohol with a polyether (such as poly(ethylene oxide), poly(propylene oxide), poly(butylene oxide), or copolymers of ethylene oxide, propylene oxide, and/or butylene oxide) to form an alkoxylated alcohol. The alkoxylated alcohol may then be reacted with an α-halocarboxylic acid (such as chloroacetic acid, chloropropionic acid, etc.) to form the alkoxylated ether acid. In a particular embodiment, the selection of n may be based on the lipophilicity of the compound and the type of polyether used in the alkoxylation. In some particular embodiments, where $R^1$ is H (formed from reaction with poly(ethylene oxide)), n may be 2 to 10 (between 2 and 5 in some embodiments and between 2 and 4 in more particular embodiments). In other particular embodiments, where $R^1$ is —$CH_3$, n may range up to 20 (and up to 15 in other embodiments). Further, selection of R (or $R^3$) and $R^2$ may also depend on the hydrophilicity of the compound due to the extent of polyetherification (i.e., number of n). In selecting each R (or $R^3$), $R^1$, $R^2$, and n, the relative hydrophilicity and lipophilicity contributed by each selection may be considered so that the desired HLB value may be achieved. Wetting agents that may be suitable for use in the fluids disclosed herein include crude tall oil, oxidized crude tall oil, surfactants, organic phosphate esters, modified imidazolines and amidoamines, alkyl aromatic sulfates and sulfonates, and the like, and combinations or derivatives of these.

Organophilic clays, normally amine treated clays, may be useful as viscosifiers and/or emulsion stabilizers in the fluid composition disclosed herein. Other viscosifiers, such as oil soluble polymers, polyamide resins, polycarboxylic acids and soaps can also be used. The amount of viscosifier used in the composition can vary upon the end use of the composition. However, normally about 0.1% to 6% by weight range is sufficient for most applications. Conventional suspending agents that may be used in the fluids disclosed herein include organophilic clays, amine treated clays, oil soluble polymers, polyamide resins, polycarboxylic acids, and soaps. The amount of conventional suspending agent used in the composition, if any, may vary depending upon the end use of the composition. However, normally about 0.1% to about 6% by weight is sufficient for most applications.

Weighting agents or density materials conventionally used in drilling fluids include galena, hematite, magnetite, iron oxides, illmenite, barite, siderite, celestite, dolomite, calcite, and the like. The quantity of such material added, if any, depends upon the desired density of the final composition. Weight material is added to result in a drilling fluid density of up to about 24 pounds per gallon, but a lower density may be particularly desired for drilling through depleted reservoirs, for example up to 16 ppg.

Typical gelling materials that may be used in the drilling fluids disclosed herein include bentonite, sepiolite, clay, attapulgite clay, anionic high-molecular weight polymer and biopolymers.

In various embodiments, methods of drilling a subterranean hole may include mixing an oleaginous fluid, a non-oleaginous fluid, an emulsifier, such as those described above, with an inactivated first component and optionally a second component; and drilling the subterranean hole using this fluid as the drilling fluid. The fluid may be pumped down to the bottom of the well through a drill pipe, where the fluid emerges through ports in the drilling bit, for example. In one embodiment, the fluid may be used in conjunction with any drilling operation, which may include, for example, vertical drilling, extended reach drilling, and directional drilling, and may be particularly suitable for drilling through depleted reservoirs, especially depleted sandstone formations. The first component and second component may be provided together in the drilling fluid as a preventative measure to react in situ to form a chemical sealing layer in the filter cake formed on walls of a wellbore through a depleted reservoir. In one or more other embodiments, one of the components may be provided as a background, and the second component may be added once losses are registered, to react with the first component (now in the filter cake) to form a chemical sealing layer on the filter cake as a remediative measure.

Embodiments of the present disclosure may provide at least one of the following advantages. The two component system disclosed may be particularly suitable for drilling through depleted sandstone formations, as well as other depleted formation types, which present numerous technical challenges. By adding the second component once fluid losses are registered, the chemical seal formed by the reaction of the first and second component may be highly localized and selectively formed directly at the loss zone. This results in both material savings from the limited use of the second component and time savings as it allows for selectively treating the formation while drilling, without having to trip out the drill string to treat the loss zone.

Although a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of sealing a formation, comprising:
   drilling a wellbore through the formation while pumping a non-aqueous based wellbore fluid comprising an encapsulated first component into the wellbore, the non-aqueous based wellbore fluid forming a filter cake in the wellbore;
   registering a fluid loss during the drilling and after at least some of the non-aqueous wellbore fluid has been pumped into the wellbore; and
   adding a second component to the wellbore fluid in response to the fluid loss registered during the drilling, wherein, at a point during the pumping of the non-aqueous based wellbore fluid, the first component is released from encapsulation, whereby the released first component and the second component chemically react with each other to form a chemical sealing layer in the filter cake.

2. The method of claim 1, wherein the first component is encapsulated in a composition comprising a dissolvable component.

3. The method of claim 2, wherein the dissolvable component is a material that melts at a temperature greater than 125° F.

4. The method of claim 3, wherein the dissolvable component is carnauba wax.

5. The method of claim 1, wherein the first component is at least one of a sodium or potassium silicate in solid or solution form.

6. The method of claim 5, wherein the second component is at least one of an amine, alcohol, an ester hydrolyzable in downhole conditions to produce an alcohol, or an amide hydrolyzable in downhole conditions to produce an amine.

7. The method of claim 6, wherein the second component is at least one of the alcohol or ester hydrolysable in downhole conditions to produce an alcohol; and
   wherein the alcohol or alcohol produced from hydrolysis of the ester is at least one of ethanol, glycerol, or any two to ten carbon molecule containing at least one alcohol group.

8. The method of claim 5, wherein the second component is at least one of calcium chloride, strontium chloride, or aluminum sulfate.

9. The method of claim 1, wherein the first component is at least one of calcium chloride, strontium chloride, aluminum sulfate, an amine, an alcohol, an ester hydrolyzable in downhole conditions to produce an alcohol, or an amide hydrolyzable in downhole conditions to produce an amine.

10. The method of claim 9, wherein the second component is a sodium or potassium silicate fluid.

* * * * *